US012546091B2

(12) United States Patent
Jung

(10) Patent No.: US 12,546,091 B2
(45) Date of Patent: Feb. 10, 2026

(54) ENERGY RECOVERY APPARATUS

(71) Applicant: READI ROBUST MACHINE CO., LTD., Busan (KR)

(72) Inventor: Tae Rang Jung, Gyeongsangnam-do (KR)

(73) Assignee: READI ROBUST MACHINE CO., LTD., Busan (KR)

( * ) Notice: Subject to any disclaimer, the term of this patent is extended or adjusted under 35 U.S.C. 154(b) by 0 days.

(21) Appl. No.: 18/869,611

(22) PCT Filed: Dec. 1, 2022

(86) PCT No.: PCT/KR2022/019330
§ 371 (c)(1),
(2) Date: Nov. 26, 2024

(87) PCT Pub. No.: WO2023/229125
PCT Pub. Date: Nov. 30, 2023

(65) Prior Publication Data

US 2025/0354351 A1 Nov. 20, 2025

(30) Foreign Application Priority Data

May 27, 2022 (KR) ........................ 10-2022-0065454
Sep. 19, 2022 (KR) ........................ 10-2022-0118094

(51) Int. Cl.
*E02F 9/22* (2006.01)
*E02F 9/08* (2006.01)
(Continued)

(52) U.S. Cl.
CPC .......... *E02F 9/2217* (2013.01); *E02F 9/0808* (2013.01); *E02F 9/2203* (2013.01);
(Continued)

(58) Field of Classification Search
CPC .......... F15B 1/04; E02F 9/0808; E02F 9/2217
See application file for complete search history.

(56) References Cited

U.S. PATENT DOCUMENTS

2004/0173979 A1* 9/2004 Ichimura ................ B60G 11/30
280/6.154
2013/0098012 A1* 4/2013 Opdenbosch ......... E02F 9/2292
60/413

FOREIGN PATENT DOCUMENTS

JP H10-168928 A 6/1998
JP 2010-084888 A 4/2010
(Continued)

OTHER PUBLICATIONS

International Search Report from corresponding PCT Application No. PCT/KR2022/019330, dated Mar. 6, 2023.
(Continued)

*Primary Examiner* — Abiy Teka
(74) *Attorney, Agent, or Firm* — Harness, Dickey & Pierce, P.L.C.

(57) ABSTRACT

The present disclosure relates to an energy recovery apparatus, and more particularly, to an energy recovery apparatus for construction machinery and a construction machine including the same. According to the present disclosure, the energy recovery apparatus is able to recover and utilize energy wasted in the event of boom-down by including an accumulator assembly, to operate in various modes of operation, and to be easily installed in or detached from existing construction machinery.

10 Claims, 10 Drawing Sheets

(51) Int. Cl.
*F15B 1/04* (2006.01)
*E02F 3/32* (2006.01)

(52) U.S. Cl.
CPC .......... *E02F 9/2267* (2013.01); *E02F 9/2275* (2013.01); *F15B 1/04* (2013.01); *E02F 3/32* (2013.01); *E02F 9/2285* (2013.01); *E02F 9/2292* (2013.01)

(56) References Cited

FOREIGN PATENT DOCUMENTS

| | | | |
|---|---|---|---|
| JP | 2015090194 | A | 5/2015 |
| JP | 2016-079764 | A | 5/2016 |
| JP | 2019065972 | A | 4/2019 |
| JP | 2019-172409 | A | 10/2019 |
| JP | 2021-152393 | A | 9/2021 |
| KR | 20-0200233 | Y1 | 10/2000 |
| KR | 10-2016-0055836 | A | 5/2016 |
| KR | 10-2016-0079814 | A | 7/2016 |
| KR | 10-2017-0066085 | A | 6/2017 |
| KR | 10-2082028 | B1 | 2/2020 |
| KR | 10-2149155 | B1 | 8/2020 |
| KR | 10-2258694 | B1 | 6/2021 |
| KR | 10-2309862 | B1 | 10/2021 |
| WO | 2014073248 | A1 | 5/2014 |

OTHER PUBLICATIONS

Office Action from corresponding Korean Office Action No. 10-2022-0118094, dated Dec. 19, 2022.
Office Action from corresponding Korean Patent Application No. 10-2022-0118094, dated Aug. 17, 2023.
Office Action from corresponding Japanese Patent Application No. 2024-570506, dated Oct. 21, 2025.

* cited by examiner

ENERGY RECOVERY APPARATUS

CROSS-REFERENCE TO RELATED APPLICATIONS

This application is a national phase application of PCT Application No. PCT/KR2022/019330 filed on Dec. 1, 2022, which claims benefit of Korean Patent Application Nos. 10-2022-0065454 filed on May 27, 2022 and 10-2022-0118094 filed on Sep. 19, 2022. The entire disclosure of the applications identified in this paragraph are incorporated herein by references.

TECHNICAL FIELD

The present disclosure relates to an energy recovery apparatus, and more particularly, to an energy recovery apparatus for construction machinery and a construction machine including the same.

BACKGROUND ART

Forklifts or excavators are construction machines that are typically used for digging into or cutting the ground, and are widely used in construction sites and various industrial sites. These forklifts may each include a boom having an end movable along a curved trajectory, and the end of the boom may be equipped with a number of tools such as buckets.

The boom is connected with a hydraulic cylinder, and the hydraulic cylinder drives the boom while moving up and down. The hydraulic cylinder is moved up and down by means of the flow of oil in hydraulic systems. The forklift includes a power means such as an engine. The engine may provide force for the flow of oil in hydraulic systems and at the same time provide power for the movement of the forklift.

Typically, the forklift consumes a lot of fuel when moving because it is very heavy. In addition, a lot of fuel is consumed to drive the boom because the dead weight of the boom is large.

With the recent emergence of green issues, various technologies are developed and researched to improve fuel efficiency in the field of construction machinery such as forklifts. For example, a technology or the like has been proposed to assist in the movement of a forklift or the actuation of a boom by recovering the potential energy of the boom and then temporarily storing it when the boom of the forklift is moved down. However, these conventional technologies may reduce work efficiency due to great restrictions on the working operation or working speed of the boom or the like, and may be very difficult to install on a variety of existing forklifts.

DISCLOSURE

Technical Problem

The present disclosure has been made in view of the technical background as described above, and is directed to use for construction machinery. The present disclosure provides an energy recovery apparatus for construction machinery, which is capable of recovering and utilizing energy wasted in the event of boom-down, of operating in various modes of operation, and of being easily installed in or detached from existing construction machinery, and a construction machine including the same.

Technical Solution

In accordance with an aspect of the present disclosure, there is provided an energy recovery apparatus for construction machinery, which is installed in a construction machine having a cylinder moving up and down by means of a flow of oil and a boom driven by the cylinder. The energy recovery apparatus includes a bracket, an accumulator, a main pipe, and a valve assembly. The bracket is detachably fastened to the construction machine. The accumulator is placed on the bracket and configured to accumulate oil. The main pipe is placed on the bracket and connected to the cylinder. The valve assembly is placed on the bracket and connected to the main pipe. The valve assembly includes a first line, a second line, and an LA valve. The first line is connected to a large chamber in the cylinder. The second line connects the first line and the accumulator. The LA valve is provided to allow oil to flow only toward the accumulator in the second line and to enable control of its flow rate.

The valve assembly may further include a third line connecting the first line and the accumulator, and an AL valve provided to allow oil to flow only toward the first line in the third line and to enable control of its flow rate.

The main pipe and the valve assembly may be arranged on a front side of the bracket facing the boom, and the bracket may have a hollow formed on its rear side.

The bracket may have a mount placed between the front side and the rear side thereof to mount the accumulator.

A boom-up valve for boom-up of the boom and a boom-down valve for boom-down of the boom may be connected to a main control valve of the construction machine. The boom-up valve and the boom-down valve may be controlled by an electronic control unit based on an operation signal of a joystick of the construction machine.

The energy recovery apparatus may further include a hydraulic motor assembly having a hydraulic motor configured to generate a rotational force by means of a fluid. The valve assembly may further include a fourth line connecting the accumulator and the hydraulic motor, and an AM valve provided to enable control of a flow rate of oil in the fourth line. The hydraulic motor may be connected to a shaft of an engine of the construction machine to provide the rotational force to the shaft.

The valve assembly may further include a fifth line connected to a small chamber in the cylinder, a sixth line branched from the first line and connected to the fifth line, and an LS valve provided to enable control of a flow rate of oil in the sixth line.

The valve assembly may further include a seventh line branched from the first line and connected to an oil tank, and an LT valve provided to enable control of a flow rate of oil in the seventh line.

The valve assembly may further include a release valve placed on a passage between the accumulator and an oil tank, and operated in an on/off manner.

A separate terminal capable of communication may be provided outside, and the valve assembly may be controlled by an electronic control unit based on an operation signal of the terminal.

The valve assembly may be controlled in an eco mode or a power mode. The eco mode may be a mode in which an output of an engine of the construction machine is assisted by means of the oil accumulated in the accumulator. The power mode may be a mode in which boom-up of the boom is assisted by means of the oil accumulated in the accumulator.

In accordance with another aspect of the present disclosure, there is provided a construction machine that includes a body, a cylinder, a boom, a bracket, an accumulator, a main pipe, and a valve assembly. The cylinder is connected to the body and moves up and down by means of a flow of oil. The boom is connected to the body and driven by the cylinder. The bracket is detachably fastened to the body. The accumulator is placed on the bracket and configured to accumulate oil. The main pipe is placed on the bracket and connected to the cylinder. The valve assembly is placed on the bracket and connected to the main pipe. The valve assembly includes a first line, a second line, a third line, an LA valve, and an AL valve. The first line is connected to a large chamber in the cylinder. The second and third lines connect the first line and the accumulator. The LA valve is provided to allow oil to flow only toward the accumulator in the second line and to enable control of its flow rate. The AL valve is provided to allow oil to flow only toward the first line in the third line and to enable control of its flow rate.

Advantageous Effects

An energy recovery apparatus for construction machinery and a construction machine including the same according to the present disclosure have an effect in that the energy recovery apparatus is able to recover and utilize energy wasted in the event of boom-down by including an accumulator assembly, to operate in various modes of operation, and to be easily installed in or detached from existing construction machinery.

BEST MODE

Figure 1:
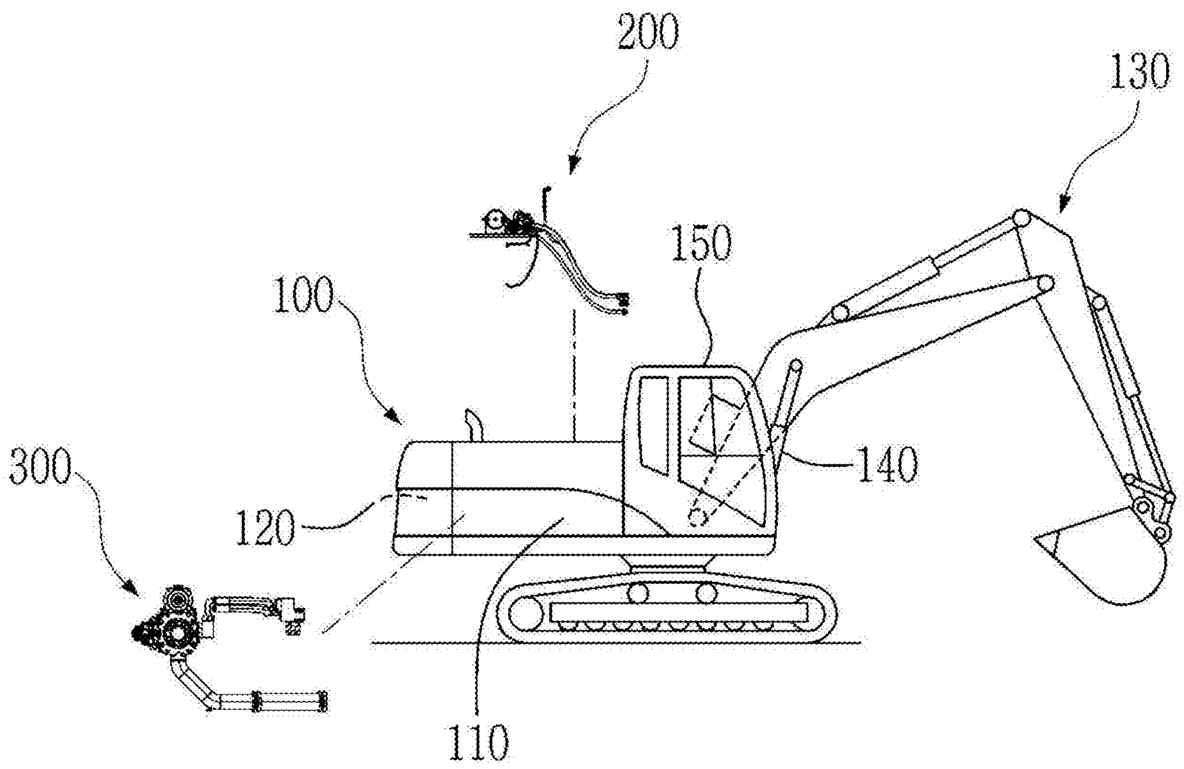
FIG. 1 is a conceptual view illustrating an overall appearance of a construction machine according to an embodiment of the present disclosure.

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims. The terminology used herein is for the purpose of describing specific embodiments only and is not intended to limit the scope of the disclosure. As used herein, the singular forms “a”, “an” and “the” are intended to include the plural forms as well, unless the context clearly indicates otherwise. In the disclosure, terms such as “comprises”, “includes”, or “have/has” should be construed as designating that there are such features, integers, steps, operations, components, parts, and/or combinations thereof, not to exclude the presence or possibility of adding of one or more of other features, integers, steps, operations, components, parts, and/or combinations thereof. Reference will now be made in detail to exemplary embodiments of the present disclosure, examples of which are illustrated in the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Hereinafter, an energy recovery apparatus for construction machinery and a construction machine including the same according to the present disclosure will be described in detail with reference to the accompanying drawings.

Figure 2:
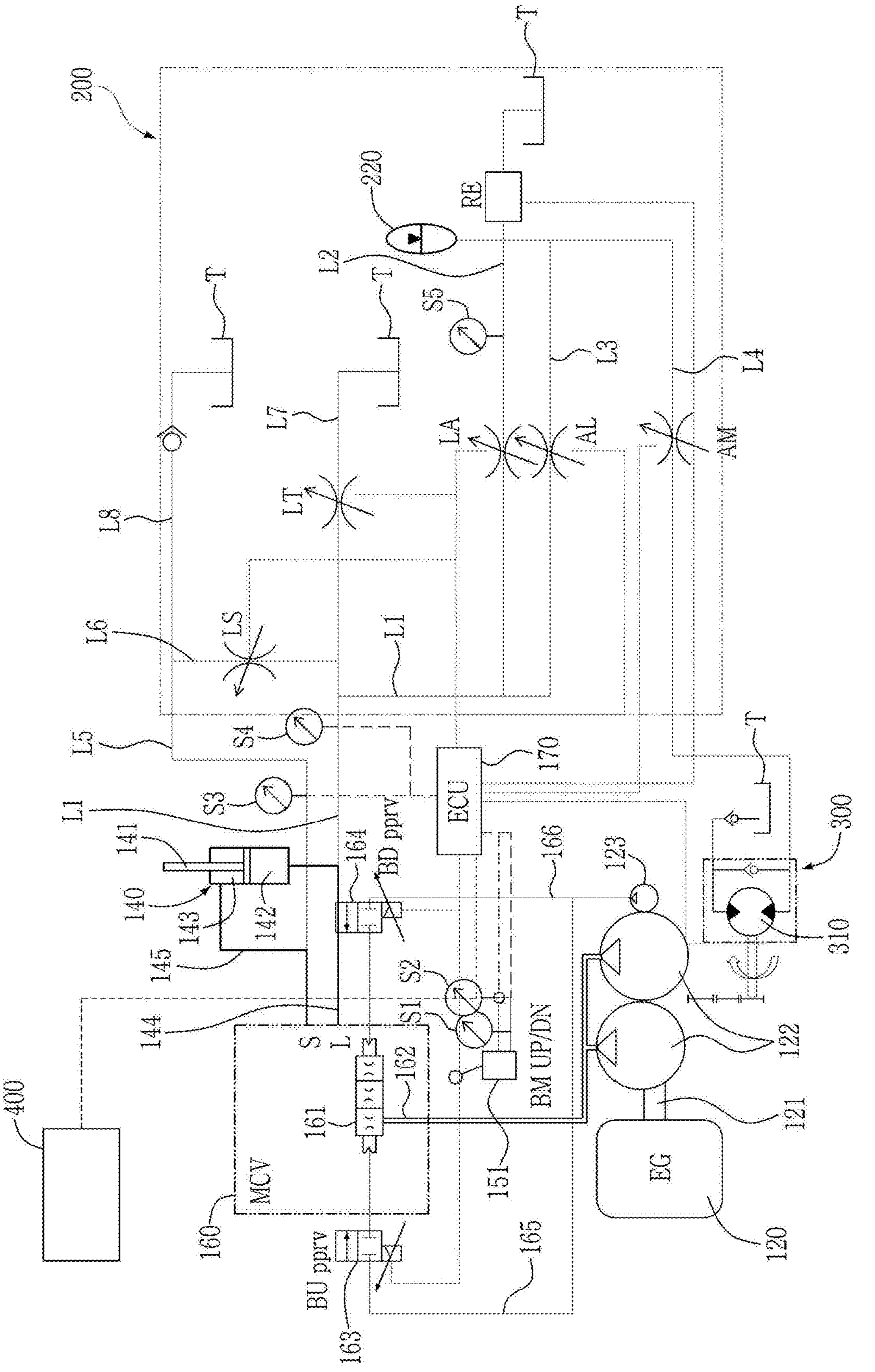
FIG. 2 is a schematic diagram of the construction machine according to the embodiment of the present disclosure.
Figure 3:
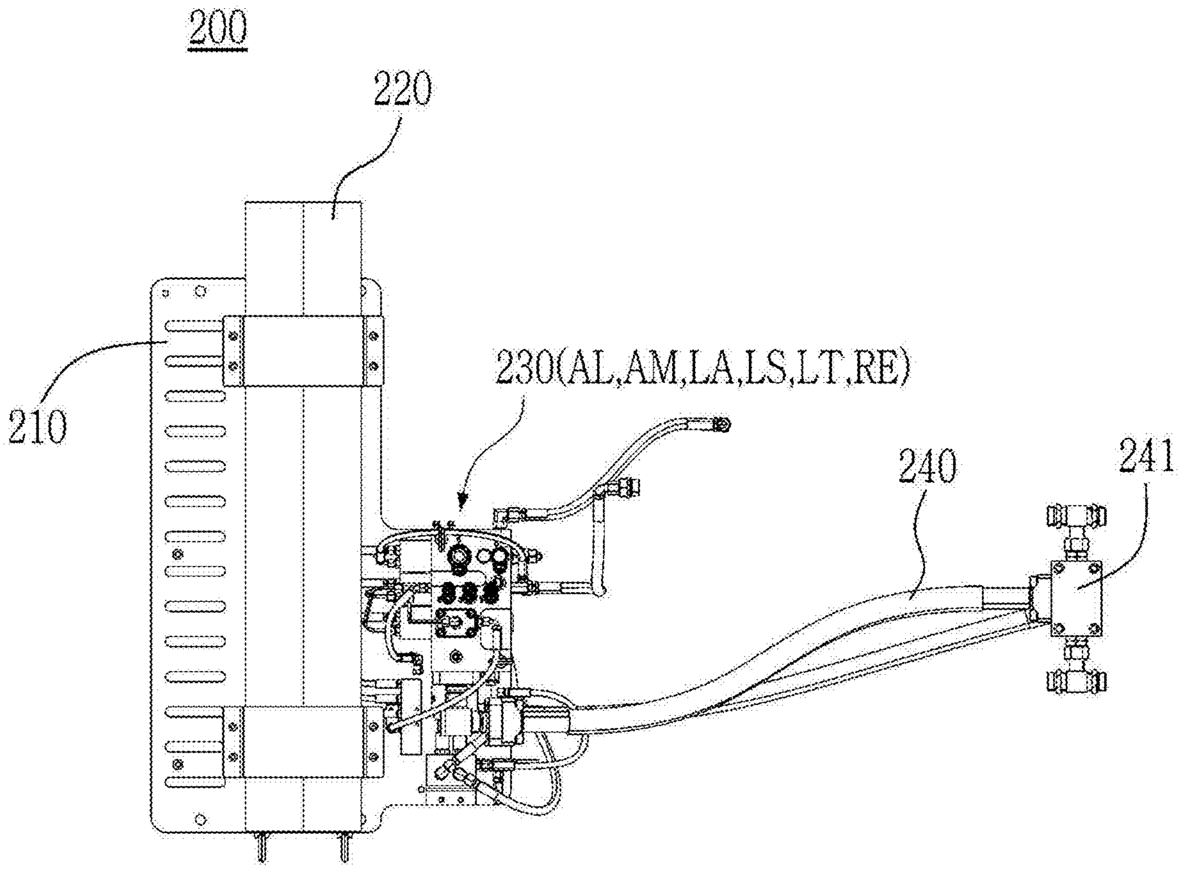
FIG. 3 is a top view illustrating an accumulator assembly according to the embodiment of the present disclosure.
Figure 4:
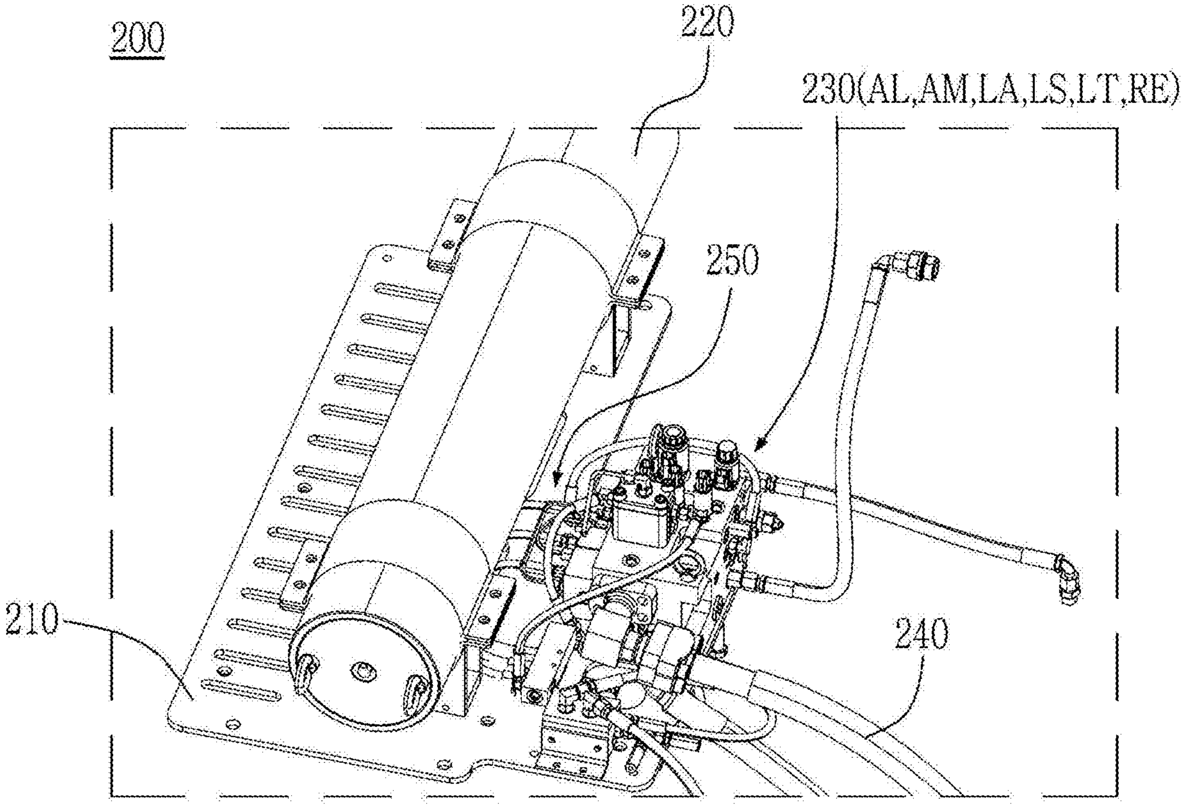
FIG. 4 is a perspective view illustrating the accumulator assembly according to the embodiment of the present disclosure.
Figure 5:
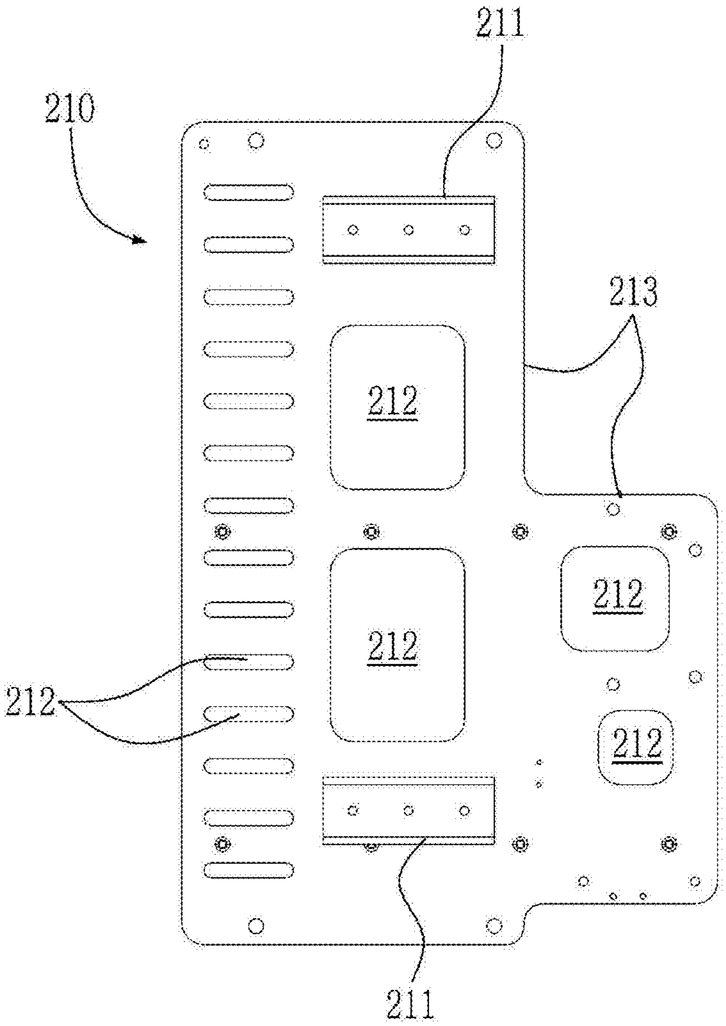
FIG. 5 is a top view illustrating only a bracket cut out from the accumulator assembly according to the embodiment of the present disclosure.
Figure 6:
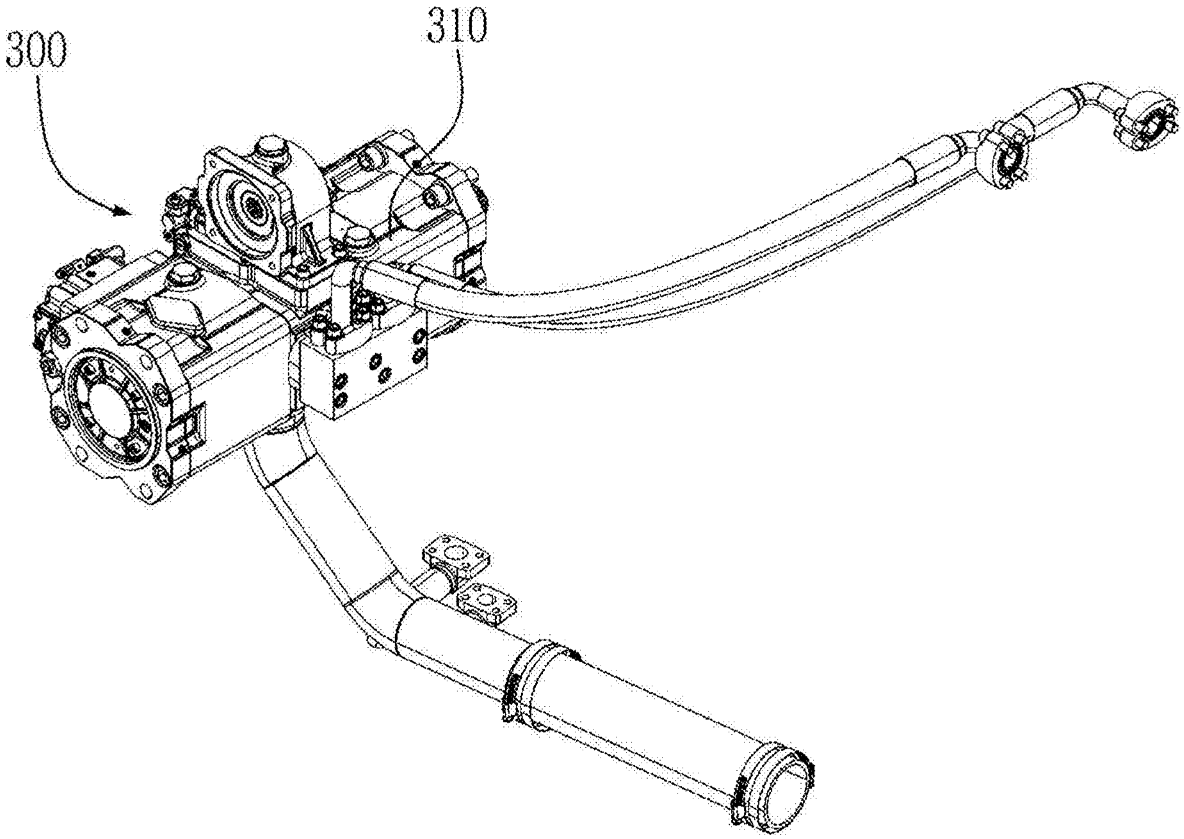
FIG. 6 is a perspective view illustrating a hydraulic motor assembly according to the embodiment of the present disclosure.

FIG. 1 is a conceptual view illustrating an overall appearance of a construction machine according to an embodiment of the present disclosure. FIG. 2 is a schematic diagram of the construction machine according to the embodiment of the present disclosure. FIG. 3 is a top view illustrating an accumulator assembly according to the embodiment of the present disclosure. FIG. 4 is a perspective view illustrating the accumulator assembly according to the embodiment of the present disclosure. FIG. 5 is a top view illustrating only a bracket cut out from the accumulator assembly according to the embodiment of the present disclosure. FIG. 6 is a perspective view illustrating a hydraulic motor assembly according to the embodiment of the present disclosure.

Hereinafter, an energy recovery apparatus for construction machinery and a construction machine 100 including the same according to exemplary embodiments of the present disclosure will be described in more detail with reference to FIGS. 1 to 6.

The construction machine 100 according to the embodiment of the present disclosure includes a body 110, a boom 130, and a cylinder 140. The boom 130 is connected to the body 110. The cylinder 140 is connected to the body 110. The cylinder 140 is moved up and down by means of the flow of oil. The boom 130 may be rotated by the upward and downward movement of the cylinder 140. The body 110 is equipped with an engine 120 therein. The engine 120 may provide the cylinder 140 with the flow of oil. The engine 120 may provide a driving force to a drive unit (not shown) placed at the bottom of the body 110.

The operation of the cylinder 140 will be discussed in more detail as follows. The construction machine 100 may have a cabinet 150 placed in the body 110 for an operator to board, and the cabinet 150 may be provided with a joystick 151 for controlling the boom-up or boom-down motion of the boom 130. The construction machine 100 may have a main control valve 160 placed therein. The main control valve 160 may have a spool 161 placed thereon. The cylinder 140 has a rod 141 that is raised and lowered and connected to the boom 130. The rod 141 may be placed between a small chamber 143 and a large chamber 142 in the cylinder 140. The rod 141 may be raised when oil enters the large chamber 142, and may be lowered when oil enters the small chamber 143. The boom 130 may be moved up when the rod 141 is raised, and the boom 130 may be moved down when the rod 141 is lowered.

The large chamber 142 may be connected to the main control valve 160 by a large chamber line 144, and the small chamber 143 may be connected to the main control valve 160 by a small chamber line 145. The operation of the spool 161 of the main control valve 160 enables oil to flow toward the small chamber 143 or toward the large chamber 142. In other words, the rod 141 of the cylinder 140 may be raised or lowered by the operation of the spool 161 of the main control valve 160. The engine 120 may be equipped with a shaft 121, which is connected to a main pump 122. The main pump 122 and the spool 161 may be connected to a main valve line 162, and oil may flow to the spool 161 and the main control valve 160 through the main valve line 162.

The spool 161 may be controlled by a boom-up valve 163 and a boom-down valve 164. An auxiliary pump 123 may be connected to the shaft 121 of the engine 120. The auxiliary pump 123 and the spool 161 may be connected to a boom-up valve line 165, and the boom-up valve 163 may be placed in the boom-up valve line 165. The auxiliary pump 123 and the spool 161 may be connected to a boom-down valve line 166, and the boom-down valve 164 may be placed in the boom-down valve line 166. When the boom-up valve 163 is opened, the spool 161 may move so that oil flows to the large chamber 142. When the boom-down valve 164 is opened, the spool 161 may move so that oil flows to the small chamber 143.

The construction machine 100 may have an electronic control unit 170. The joystick 151 may be equipped with a first sensor S1 and a second sensor S2. The first sensor S1 may detect a change in pressure during boom-up motion by the joystick 151 to generate an operation signal, and the second sensor S2 may detect a change in pressure during boom-down motion by the joystick 151 to generate an operation signal. The operation signals generated by the first sensor S1 and the second sensor S2 may be transmitted to the electronic control unit 170, and the electronic control unit 170 may control whether to open or close the boom-up valve 163 or the boom-down valve 164 based on these operation signals. Meanwhile, the boom-down valve 164 may also be placed in the large chamber line 144. In other words, the boom-down valve 164 may control a flow in the boom-down valve line 166 as well as a flow in the large chamber line 144. In this case, in some situations, when the joystick 151 is operated for boom-down, the electronic control unit 170 may control the boom-down valve 164 to close, thereby blocking the flow of oil from the large chamber 142 to the main control valve 160.

The energy recovery apparatus for construction machinery according to the embodiment of the present disclosure includes an accumulator assembly 200, and the accumulator assembly 200 includes a bracket 210, an accumulator 220, a valve assembly 230, and a main pipe 240. The bracket 210 is detachably fastened to the body 110 of the construction machine 100. The accumulator 220, the valve assembly 230, and the main pipe 240 are arranged on the bracket 210.

The accumulator 220 may be configured to accumulate oil, and the oil accumulated in advance in the accumulator 220 may be discharged from the accumulator 220 if necessary. The main pipe 240 is connected to the cylinder 140. The valve assembly 230 is connected to the main pipe 240.

The valve assembly 230 includes a first line L1, a second line L2, a third line L3, an LA valve LA, and an AL valve AL. The first line L1 is a line connected to the large chamber 142 in the cylinder 140. The first line L1 may be connected to the large chamber line 144. The second line L2 and the third line L3 are lines connecting the first line L1 and the accumulator 220. The LA valve LA is placed in the second line L2. The LA valve LA is a valve that is provided to allow oil to flow only toward the accumulator 220 in the second line L2 and to enable the control of the flow rate of this flow. The AL valve AL is placed in the third line L3. The AL valve AL is a valve that is provided to allow oil to flow only toward the first line L1 in the third line L3 and to enable the control of the flow rate of this flow.

The energy recovery apparatus for construction machinery according to the embodiment of the present disclosure may further include a hydraulic motor assembly 300. The hydraulic motor assembly 300 has a hydraulic motor 310. The hydraulic motor 310 is a device that generates a rotational force by means of a fluid, and the rotational force may be generated when oil flows into the hydraulic motor 310. The rotary shaft of the hydraulic motor 310 may be connected to the shaft 121 of the engine 120. Accordingly, the hydraulic motor 310 may provide a rotational force to the shaft 121. The hydraulic motor assembly 300 may have a pipe through which oil is introduced into or discharged from the hydraulic motor 310, and may also have a pipe connected to an oil tank T.

The valve assembly 230 may include a fourth line L4 connecting the accumulator 220 and the hydraulic motor 310. The valve assembly 230 may include an AM valve AM provided to enable the control of the flow rate of oil in the fourth line L4. The oil accumulated in the accumulator 220 may flow into the hydraulic motor 310 through the fourth line L4 to rotate the hydraulic motor 310.

The valve assembly 230 may include a fifth line L5 and a sixth line L6. The fifth line L5 is a line connected to the small chamber 143 in the cylinder 140. The fifth line L5 may be connected to the small chamber line 145. The sixth line L6 is a line that is branched from the first line L1 and connected to the fifth line L5. An LS valve LS may be provided in the sixth line L6 to enable the control of the flow rate of oil in the sixth line L6.

The valve assembly 230 may include a seventh line L7. The seventh line L7 is a line that is branched from the first line L1 and connected to the oil tank T. An LT valve LT may be provided in the seventh line L7 to enable the control of the flow rate of oil in the seventh line L7.

The valve assembly 230 may include a release valve RE. The release valve RE is placed on the passage between the accumulator 220 and the oil tank T. The release valve RE is operated in an on/off manner.

The AM valve AM, AL valve AL, LA valve LA, LS valve LS, LT valve LT, release valve RE, etc. of the valve assembly 230 discussed above may all be controlled by the electronic control unit 170.

Hereinafter, the structure of the accumulator assembly 200 and the hydraulic motor assembly 300 will be discussed in more detail with reference to FIGS. 3 to 6 in particular. As discussed above, the accumulator assembly 200 includes the bracket 210, the accumulator 220, the valve assembly 230, and the main pipe 240.

The bracket 210 is a component installed on the construction machine 100, and on which the accumulator 220, the valve assembly 230, and the main pipe 240 are arranged. The opening and closing of the valve assembly 230 may be individually adjusted by a pilot pipe 250. The main pipe 240 is a pipe connected to the cylinder 140. The main pipe 240 may be provided in a single one, and the first line L1 and the fifth line L5 may be formed together in the main pipe 240. Alternatively, the main pipe 240 may consist of two main pipes, and the first line L1 and the fifth line L5 may be formed separately in the respective main pipes. The main pipe 240 may be provided with a joint block 241 at the tip thereof. The large chamber 142 and the small chamber 143 in the cylinder 140 may be connected to the joint block 241.

The bracket 210 may have a thin plate shape or a plate shape. The bracket 210 may be placed on the outside of the construction machine 100. The bracket 210 may have a fastener (not shown) for fastening to the construction machine 100. The fastener (not shown) may be formed of, for example, a screw hole for insertion of a bolt thereinto or the like.

The main pipe 240 and the valve assembly 230 may be arranged on the front side of the bracket 210 facing the boom 130, the bracket 210 may have a hollow 212 formed on the rear side thereof, and the accumulator 220 may be placed between the front side and the rear side of the bracket 210. The bracket 210 may have a groove 213 formed on the front side thereof.

The groove 213 may be recessed rearwards from the front end of the bracket 210. The groove 213 may have a shape corresponding to the outer surface of the cabinet 150 of the construction machine 100, thereby minimizing spatial interference between the cabinet 150 and the bracket 210. The main pipe 240 and the valve assembly 230 may be arranged in an area of the front side of the bracket 210 where the groove 213 is not formed. In other words, the groove 213 may be formed on one area of the front side of the bracket 210, and the main pipe 240 and the valve assembly 230 may be arranged on the other area thereof. The structure of this bracket 210 may allow the area of the bracket 210 where the main pipe 240 and the valve assembly 230 are arranged to be closer to the boom 130, thereby minimizing the length of various pipes or lines connected to the cylinder 140, resulting in minimal resistance against the flow of oil.

The hollow 212 may formed on the rear side of the bracket 210. The engine 120 may be placed on the rear side of the accumulator assembly 200. The hollow 212 may reduce the influence of heat generated by the engine 120 on the accumulator 220. The hollow 212 may also reduce the weight of the bracket 210. The hollow 212 may be formed on the rear side of the bracket 210, as well as at the center or on the front side of the bracket 210. The accumulator 220 may be spaced apart from the rear end (end at the rear side) of the bracket 210. This makes it convenient to open an engine room to service the engine 120 and also easy for the operator to detach and install the accumulator 220, even when the accumulator assembly 200 is installed on the construction machine 100. Besides, it is possible to prevent direct transfer of the heat and vibration generated by the engine 120 to the accumulator 220.

The bracket 210 may have a mount 211 placed between the front side and the rear side thereof. The mount 211 is configured to mount the accumulator 220. The mount 211 may allow the accumulator 220 to be spaced apart from the upper surface of the bracket 210 by a predetermined distance. Accordingly, it is possible to facilitate the detachment and installation of the accumulator 220 and to prevent direct transfer of the heat and vibration generated by the engine 120 to the accumulator 220.

The bracket 210 may be detachably installed on the construction machine 100. The bracket 210 may be installed in a manner that renovates the exterior or interior of existing construction machinery. The specific size or detailed shape of the bracket 210 may be partially modified depending on the construction machine 100 to be installed. Owing to the configuration of this bracket 210, the energy recovery apparatus according to the present disclosure may be easily and conveniently installed in a variety of existing construction machines.

The hydraulic motor 310 of the hydraulic motor assembly 300 may be installed in the engine room where the engine 120 is placed in the construction machine 100. For this purpose, the hydraulic motor 310 may have a fastener (not shown) for fastening to the engine room. Besides, a pipe through which oil may be introduced or discharged, a pipe connected to the oil tank T, etc. may be provided for connection to corresponding pipes in existing construction machinery.

The energy recovery apparatus for construction machinery according to the embodiment of the present disclosure may be controlled by a terminal 400. Specifically, the terminal, which is capable of communicating with the electronic control unit 170, may be provided outside the construction machine 100, and the valve assembly 230 of the accumulator assembly 200 may be controlled by the electronic control unit 170 based on the operation signal of the terminal 400. The terminal 400 may include an input means to input a control command and an output means such as a display to display a status of operation of the accumulator assembly 200. For example, the terminal 400 may be a smartphone. The terminal 400 may communicate wirelessly with the electronic control unit 170 by means of, but not limited thereto, Bluetooth communication.

The energy recovery apparatus for construction machinery according to the embodiment of the present disclosure may be controlled in either an eco mode or a power mode, and in some cases, may be controlled in a release mode. These various modes may be set, changed, and released by the electronic control unit 170 and the terminal 400. The above various modes will be described in detail below.

Figure 7:
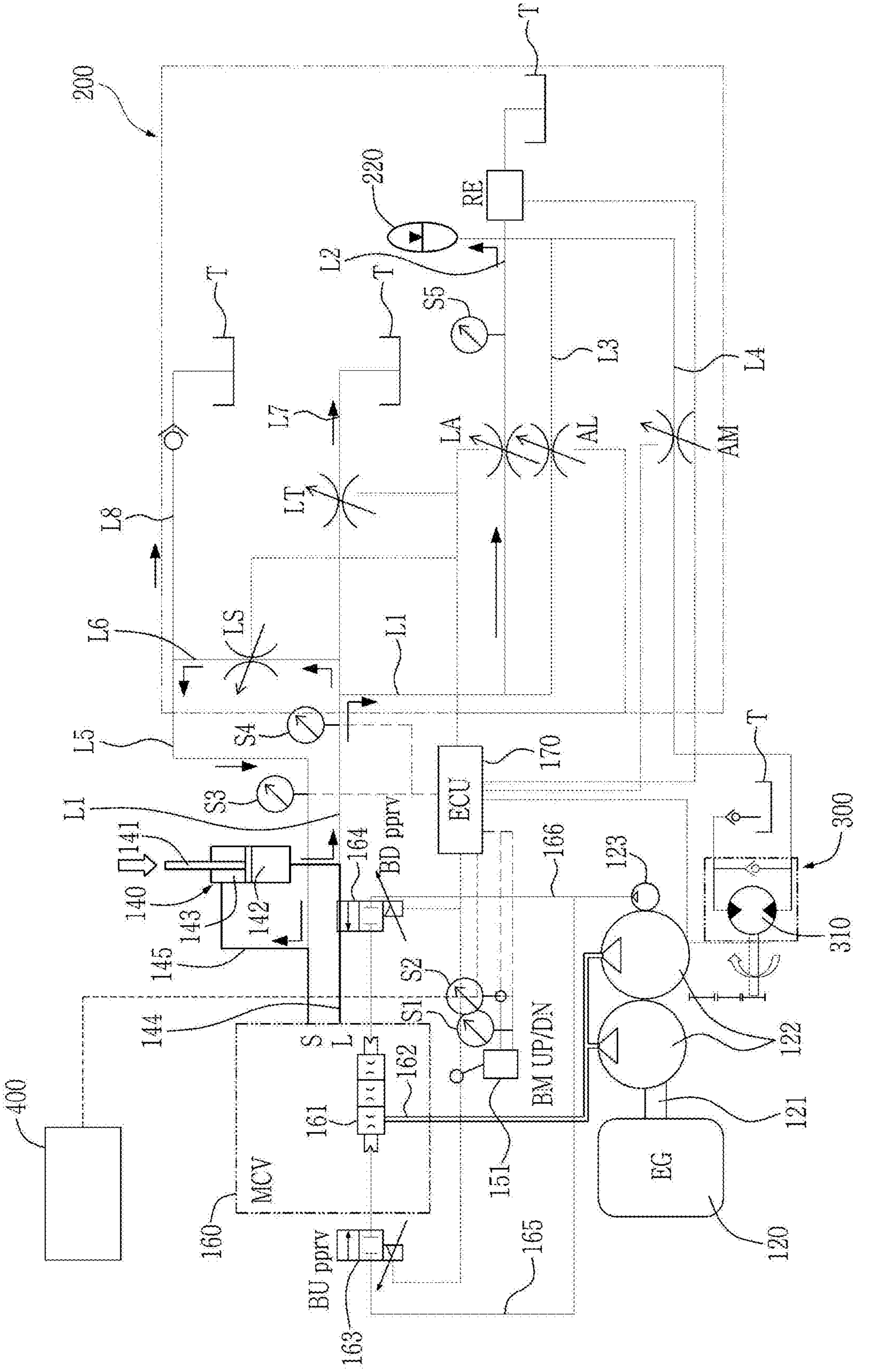
FIG. 7 is a schematic diagram illustrating a flow of oil in the event of boom-down in the construction machine according to the embodiment of the present disclosure.

FIG. 7 is a schematic diagram illustrating a flow of oil in the event of boom-down in the construction machine according to the embodiment of the present disclosure.

Hereinafter, the flow of oil when the boom 130 is moved down will be described in detail with reference to FIG. 7. When the boom 130 is moved down, the rod 141 of the cylinder 140 is lowered and the oil within the large chamber 142 is discharged through the first line L1. In this case, the boom-down valve 164 is locked so that oil may be discharged to the first line L1 without flowing toward the main control valve 160. The oil flowing in the first line L1 may flow into the accumulator 220 through the second line L2, with the consequence that oil may be accumulated within the accumulator 220. This process may allow the potential energy of the boom 130 to be stored in the accumulator 220.

If the LS valve LS is provided, opening the LS valve LS may introduce some of the oil flowing in the first line L1 into the small chamber 143 in the cylinder 140 through the sixth line L6 and the fifth line L5. Such a flow of oil may occur simultaneously with the process of accumulating oil in the accumulator 220. In other words, some of the flow in the first line L1 may flow into the accumulator 220, and the remaining portion may flow into the small chamber 143. In this case, the accumulator 220 may be made compact in size. Moreover, oil flows into the small chamber 143, which may increase the boom-down speed of the boom 130. Meanwhile, an eighth line L8 may be further connected to the fifth line L5 and the sixth line L6. The eighth line L8 may be connected to the oil tank T. The oil that has passed through the LS valve LS may also flow into the oil tank T through the eighth line L8.

If the LT valve LT is provided, opening the LT valve LT may introduce some of the oil flowing in the first line L1 into the oil tank T through the seventh line L7. If the accumulator 220 is full of oil, the boom 130 may no longer be moved down, in which case the oil may be diverted to the oil tank T to facilitate the boom-down of the boom 130. A fifth sensor S5 may be placed in front of the accumulator 220 in the second line L2. The fifth sensor S5 may measure a pressure in front of the accumulator 220. The fifth sensor S5 may measure whether the accumulator 220 is full of oil.

Meanwhile, during the boom-down of the boom 130, the accumulation may be temporarily stopped if the boom 130 touches the ground and more force is required for the boom-down of the boom 130. Here, a third sensor S3 may be placed in the first line L1 and a fourth sensor S4 may be placed in the fifth line L5. The third sensor S3 and the fourth sensor S4 may constantly measure a hydraulic pressure to transmit measured values to the electronic control unit 170, and the electronic control unit 170 may determine whether the boom 130 touches the ground based on these measured values. If the electronic control unit 170 determines that the boom 130 touches the ground, the electronic control unit 170 may close the LA valve LA to temporarily stop the accumulation of oil in the accumulator 220. In addition, the electronic control unit 170 may control all of the oil discharged from the large chamber 142 to flow into the small chamber 143 by closing both the LA valve LA and the LT valve LT and opening the LS valve LS.

The flow of oil in the event of boom-down described above may occur at all times, regardless of the mode of operation such as the eco mode or the power mode.

Figure 8:
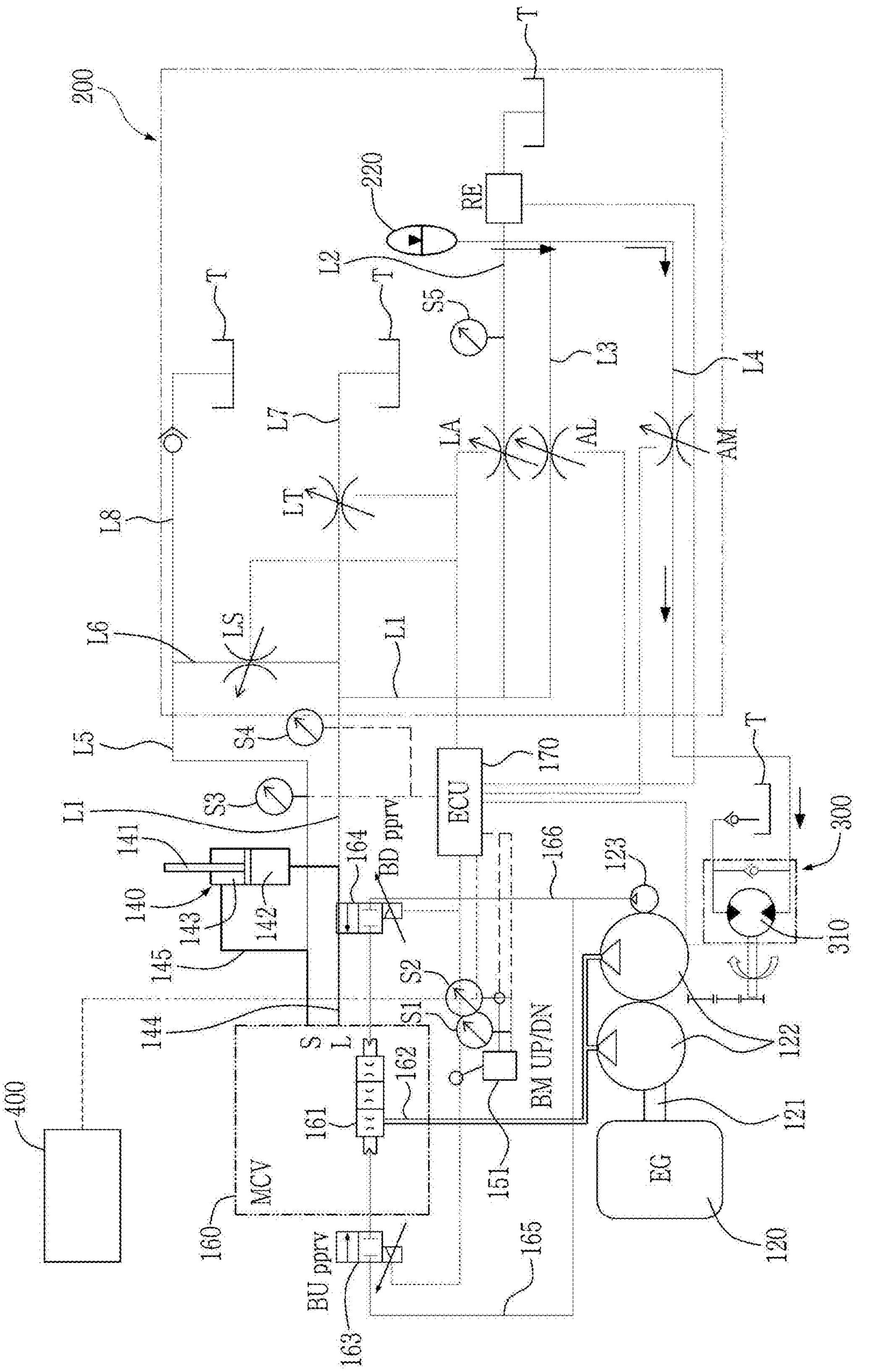
FIG. 8 is a schematic diagram illustrating a flow of oil in the event of boom-up in an eco mode in the construction machine according to the embodiment of the present disclosure.

FIG. 8 is a schematic diagram illustrating a flow of oil in the event of boom-up in the eco mode in the construction machine according to the embodiment of the present disclosure.

Hereinafter, a boom-up motion in the eco mode in the energy recovery apparatus for construction machinery and the construction machine 100 including the same according to the embodiments of the present disclosure will be described in more detail with further reference to FIG. 8. The eco mode is a mode in which the output of the engine 120 is assisted by means of the oil accumulated in the accumulator 220.

When the boom 130 is moved up in the eco mode, the AM valve AM placed in the fourth line L4 is opened. In this case, the AL valve AL placed in the third line L3 is closed. The oil accumulated in the accumulator 220 flows into the hydraulic motor 310 of the hydraulic motor assembly 300 through the fourth line L4. The rotary shaft of the hydraulic motor 310 of the hydraulic motor assembly 300 is rotated by means of the oil introduced thereinto, and the rotational force of the rotary shaft of the hydraulic motor 310 generated in this process is provided to the shaft 121 of the engine 120. In the eco mode, the rotational force of the hydraulic motor 310 may assist the output of the shaft 121 of the engine 120, thus increasing the fuel efficiency of the engine 120. Meanwhile, the oil introduced into the hydraulic motor 310 may be discharged to the oil tank T through the pipe after rotating the rotary shaft of the hydraulic motor 310.

Figure 9:
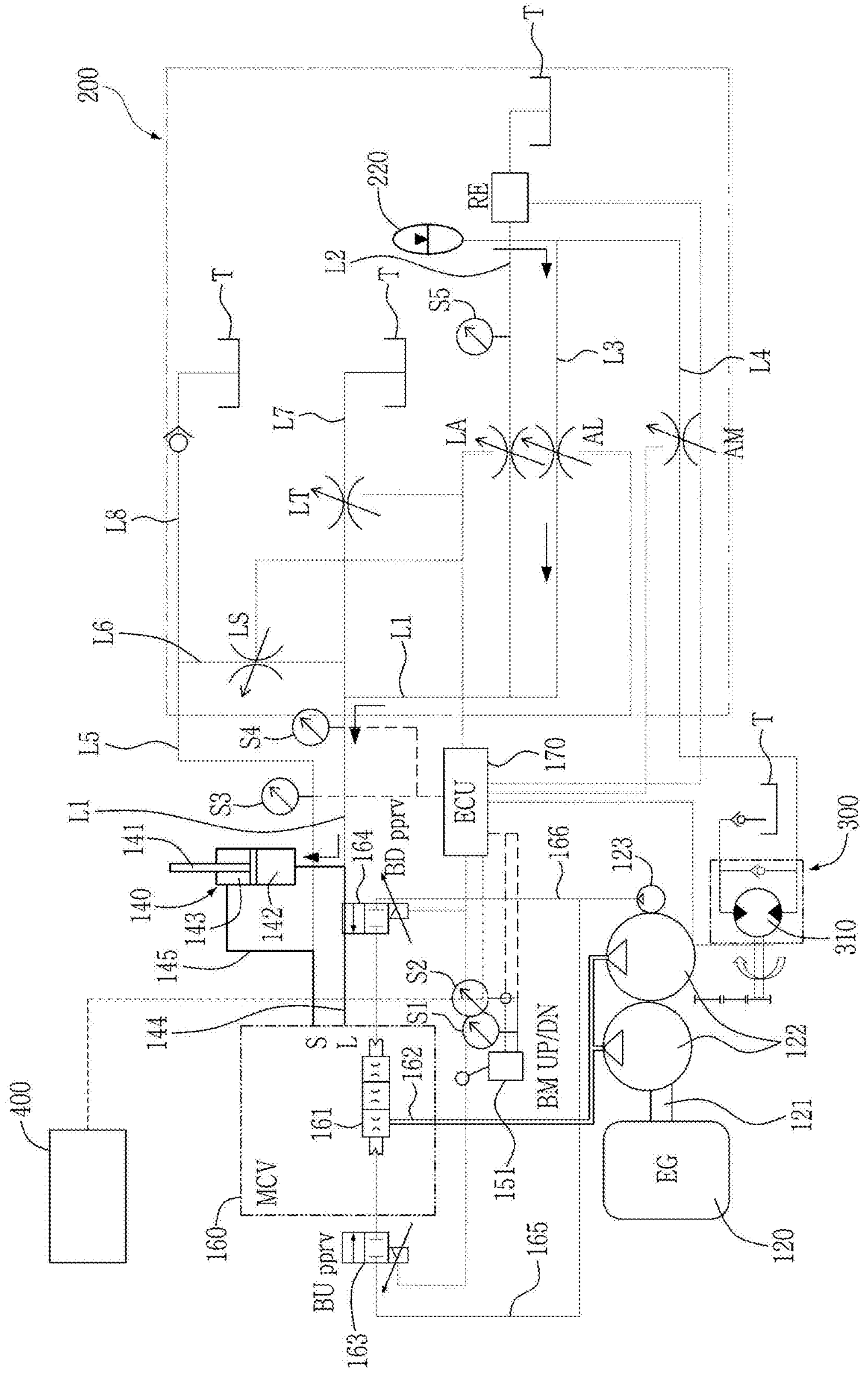
FIG. 9 is a schematic diagram illustrating a flow of oil in the event of boom-up in a power mode in the construction machine according to the embodiment of the present disclosure.

FIG. 9 is a schematic diagram illustrating a flow of oil in the event of boom-up in the power mode in the construction machine according to the embodiment of the present disclosure.

Hereinafter, a boom-up motion in the power mode in the energy recovery apparatus for construction machinery and the construction machine 100 including the same according to the embodiments of the present disclosure will be described in more detail with further reference to FIG. 9. The power mode is a mode in which the power required for the boom-up motion of the boom 130 is assisted by means of the oil accumulated in the accumulator 220.

When the boom 130 is moved up in the power mode, the AL valve AL placed in the third line L3 is opened. In this case, the AM valve AM placed in the fourth line L4 is closed. The oil accumulated in the accumulator 220 flows into the large chamber 142 through the first line L1 via the third line L3. In the power mode, oil is introduced from the accumulator 220 through the third line L3 and the first line L1, in addition to the inflow of oil to the large chamber 142 through the large chamber line 144 by the main pump 122 of the engine 120. Accordingly, in the event of boom-up in the power mode, a larger amount of oil may flow into the large chamber 142 compared to when the power mode is not used, which may increase the boom-up speed of the boom 130. Meanwhile, for the power mode, the LS valve LS, the LT valve LT, and the boom-down valve 164 may also be closed to introduce the oil flowing through the third line L3 into the large chamber 142 only through the first line L1.

Figure 10:
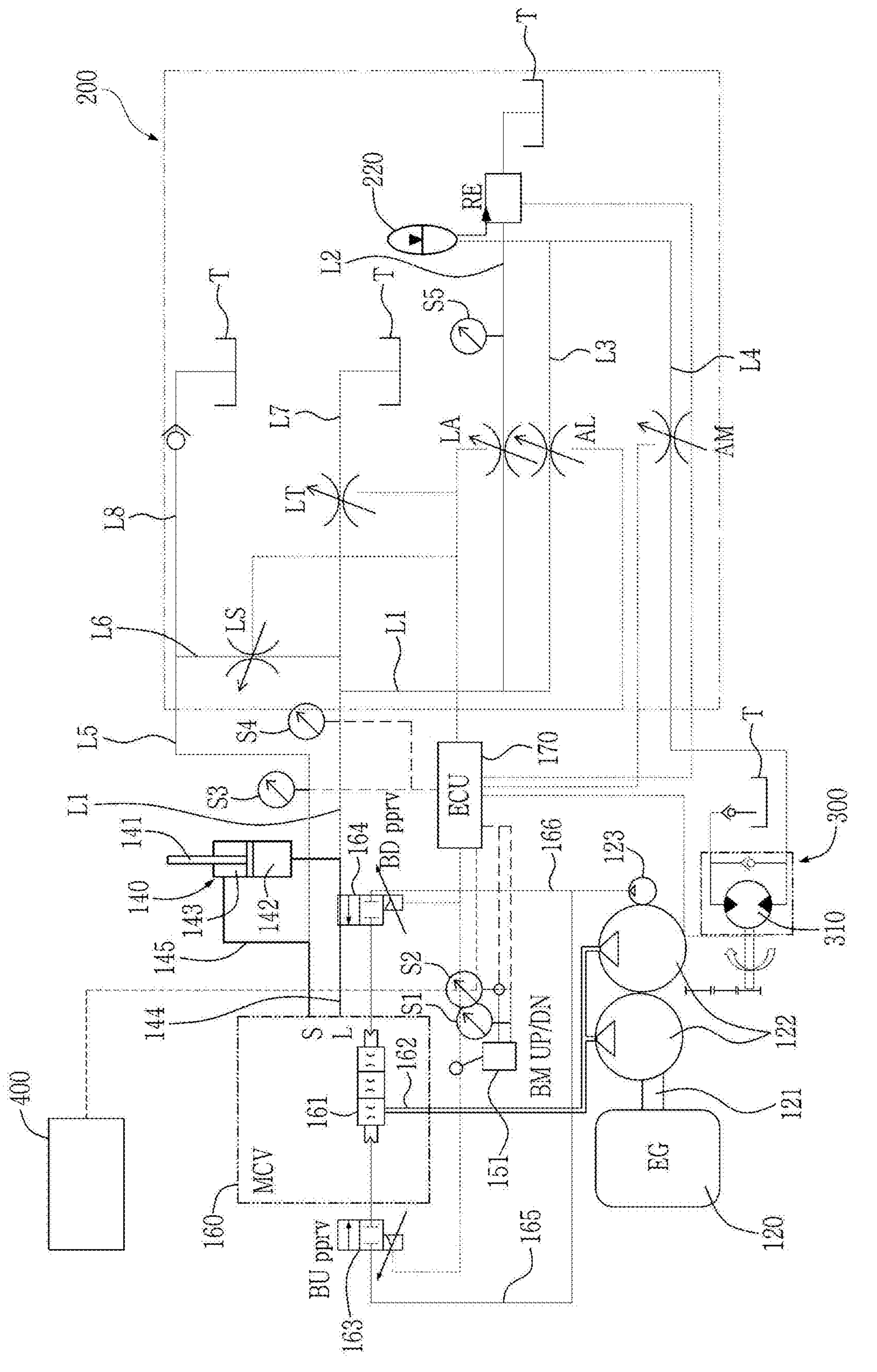
FIG. 10 is a schematic diagram illustrating a flow of oil in a release mode in the construction machine according to the embodiment of the present disclosure.

FIG. 10 is a schematic diagram illustrating a flow of oil in the release mode in the construction machine according to the embodiment of the present disclosure.

Hereinafter, an operation in the release mode in the energy recovery apparatus for construction machinery and the construction machine 100 including the same according to the embodiments of the present disclosure will be described in more detail with further reference to FIG. 10. The release mode is a mode in which the oil accumulated in the accumulator 220 is discharged to the outside.

In the release mode, the release valve RE is opened. In this case, the AL valve AL and the AM valve AM may be closed. The release valve RE may be operated in an on/off manner, and may be provided to only be opened or closed, rather than precisely adjusting a flow rate. The release mode may be used to reduce the pressure within the accumulator 220. In the release mode, the release valve RE may be opened to discharge the oil accumulated in the accumulator 220 to the oil tank T through the line connecting the accumulator 220 and the oil tank T. This release mode may be used, for example, when the construction machine 100 is not in operation or when the construction machine 100, the accumulator assembly 200, or the hydraulic motor assembly 300 is being serviced, thereby preventing safety accidents.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. An energy recovery apparatus for construction machinery, which is installed in a construction machine having a cylinder moving up and down by means of a flow of oil and a boom driven by the cylinder, the energy recovery apparatus comprising:

a bracket detachably fastened to the construction machine;

an accumulator placed on the bracket and configured to accumulate oil;

a main pipe placed on the bracket and connected to the cylinder; and a valve assembly placed on the bracket and connected to the main pipe, wherein the valve assembly comprises:

a first line connected to a large chamber in the cylinder;

a second line connecting the first line and the accumulator; and an LA valve provided to allow oil to flow only toward the accumulator in the second line and to enable control of its flow rate, wherein the valve assembly further comprises:

a third line connecting the first line and the accumulator, and an AL valve provided to allow oil to flow only toward the first line in the third line and to enable control of its flow rate.

2. The energy recovery apparatus according to claim 1, wherein:

the main pipe and the valve assembly are arranged on a front side of the bracket facing the boom;

the bracket has a hollow formed on its rear side; and the bracket has a mount placed between the front side and the rear side thereof to mount the accumulator.

3. The energy recovery apparatus according to claim 1, wherein:

a boom-up valve for boom-up of the boom and a boom-down valve for boom-down of the boom are connected to a main control valve of the construction machine; and the boom-up valve and the boom-down valve are controlled by an electronic control unit based on an operation signal of a joystick of the construction machine.

4. The energy recovery apparatus according to claim 1, further comprising a hydraulic motor assembly having a hydraulic motor configured to generate a rotational force by means of a fluid, wherein the valve assembly further comprises:

a fourth line connecting the accumulator and the hydraulic motor; and an AM valve provided to enable control of a flow rate of oil in the fourth line, and wherein the hydraulic motor is connected to a shaft of an engine of the construction machine to provide the rotational force to the shaft.

5. The energy recovery apparatus according to claim 1, wherein the valve assembly further comprises:

a fifth line connected to a small chamber in the cylinder;

a sixth line branched from the first line and connected to the fifth line; and an LS valve provided to enable control of a flow rate of oil in the sixth line.

6. The energy recovery apparatus according to claim 1, wherein the valve assembly further comprises:

a seventh line branched from the first line and connected to an oil tank; and an LT valve provided to enable control of a flow rate of oil in the seventh line.

7. The energy recovery apparatus according to claim 1, wherein the valve assembly further comprises a release valve placed on a passage between the accumulator and an oil tank, and operated in an on/off manner.

8. The energy recovery apparatus according to claim 1, wherein:

a separate terminal capable of communication is provided outside; and the valve assembly is controlled by an electronic control unit based on an operation signal of the terminal.

9. The energy recovery apparatus according to claim 1, wherein:

the valve assembly is controlled in an eco mode or a power mode;

the eco mode is a mode in which an output of an engine of the construction machine is assisted by means of the oil accumulated in the accumulator; and the power mode is a mode in which boom-up of the boom is assisted by means of the oil accumulated in the accumulator.

10. A construction machine comprising:

a body;

a cylinder connected to the body and moving up and down by means of a flow of oil;

a boom connected to the body and driven by the cylinder;

a bracket detachably fastened to the body;

an accumulator placed on the bracket and configured to accumulate oil;

a main pipe placed on the bracket and connected to the cylinder; and a valve assembly placed on the bracket and connected to the main pipe, wherein the valve assembly comprises:

a first line connected to a large chamber in the cylinder;

second and third lines connecting the first line and the accumulator;

an LA valve provided to allow oil to flow only toward the accumulator in the second line and to enable control of its flow rate; and an AL valve provided to allow oil to flow only toward the first line in the third line and to enable control of its flow rate.

* * * * *